Jan. 10, 1961 L. A. BOGAR ET AL 2,967,634
VEHICLE TRANSFER CARRIER
Filed Dec. 26, 1956 3 Sheets-Sheet 2
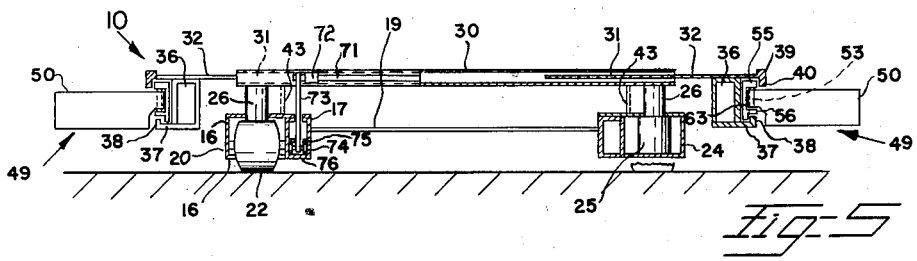
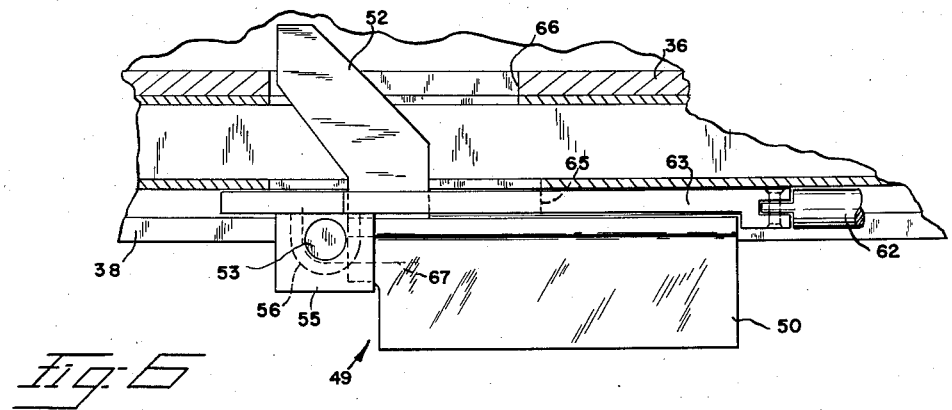
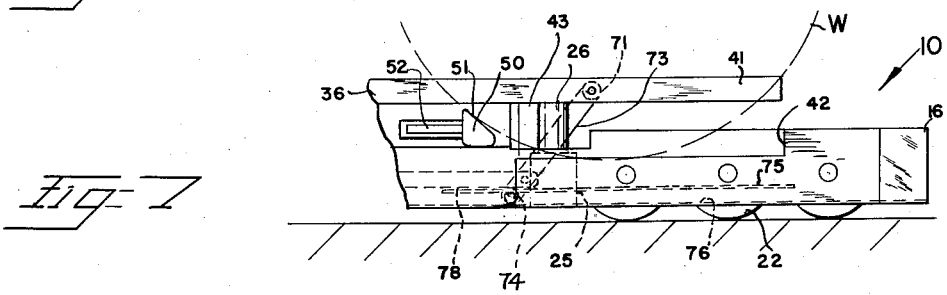
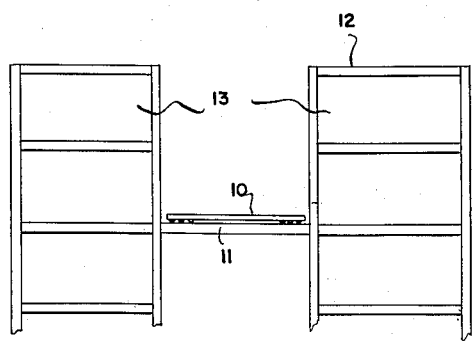
INVENTOR.
LAWRENCE A. BOGAR
ADRIAN L. LONG
BY
Cook and Schermerhorn
ATTORNEYS

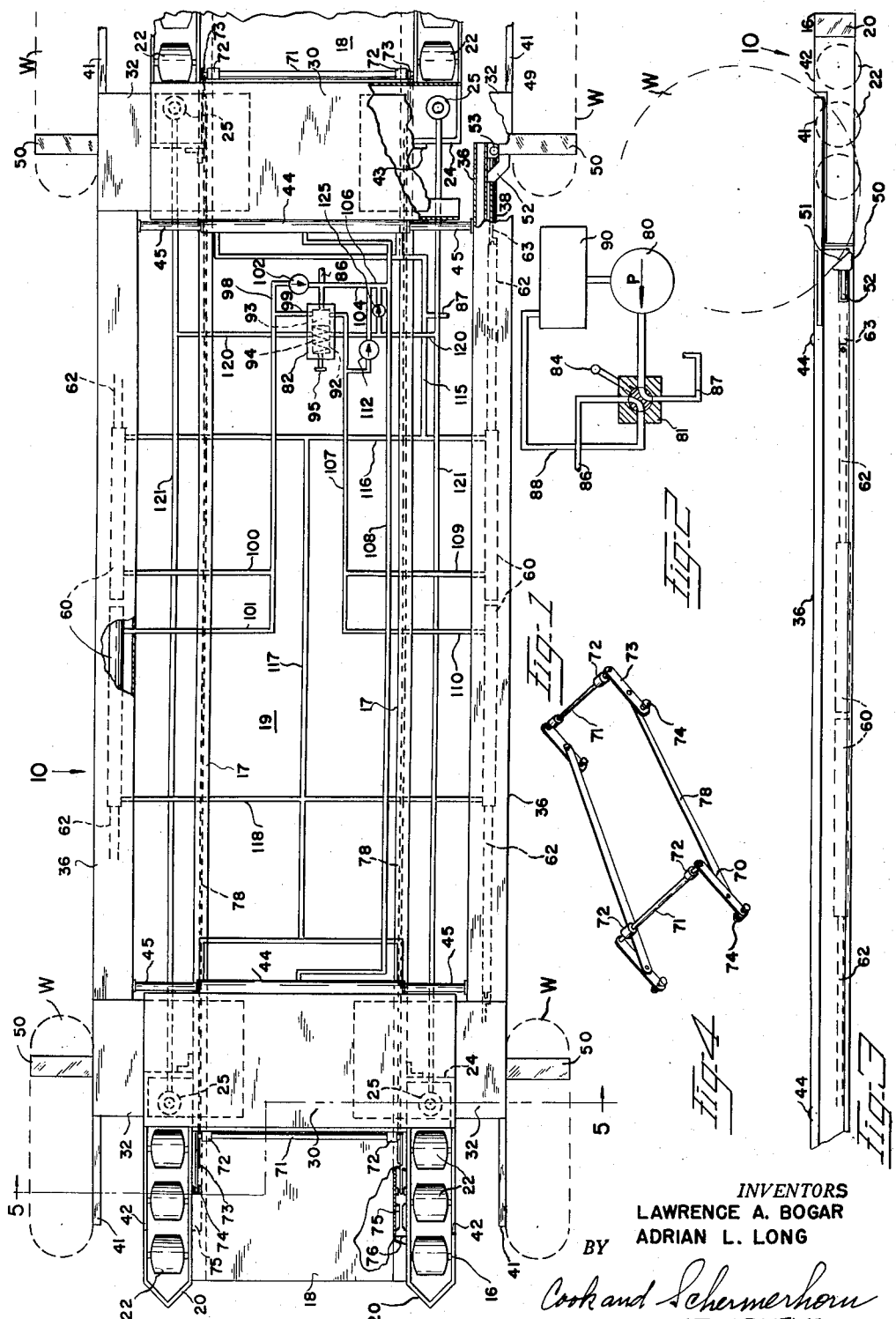

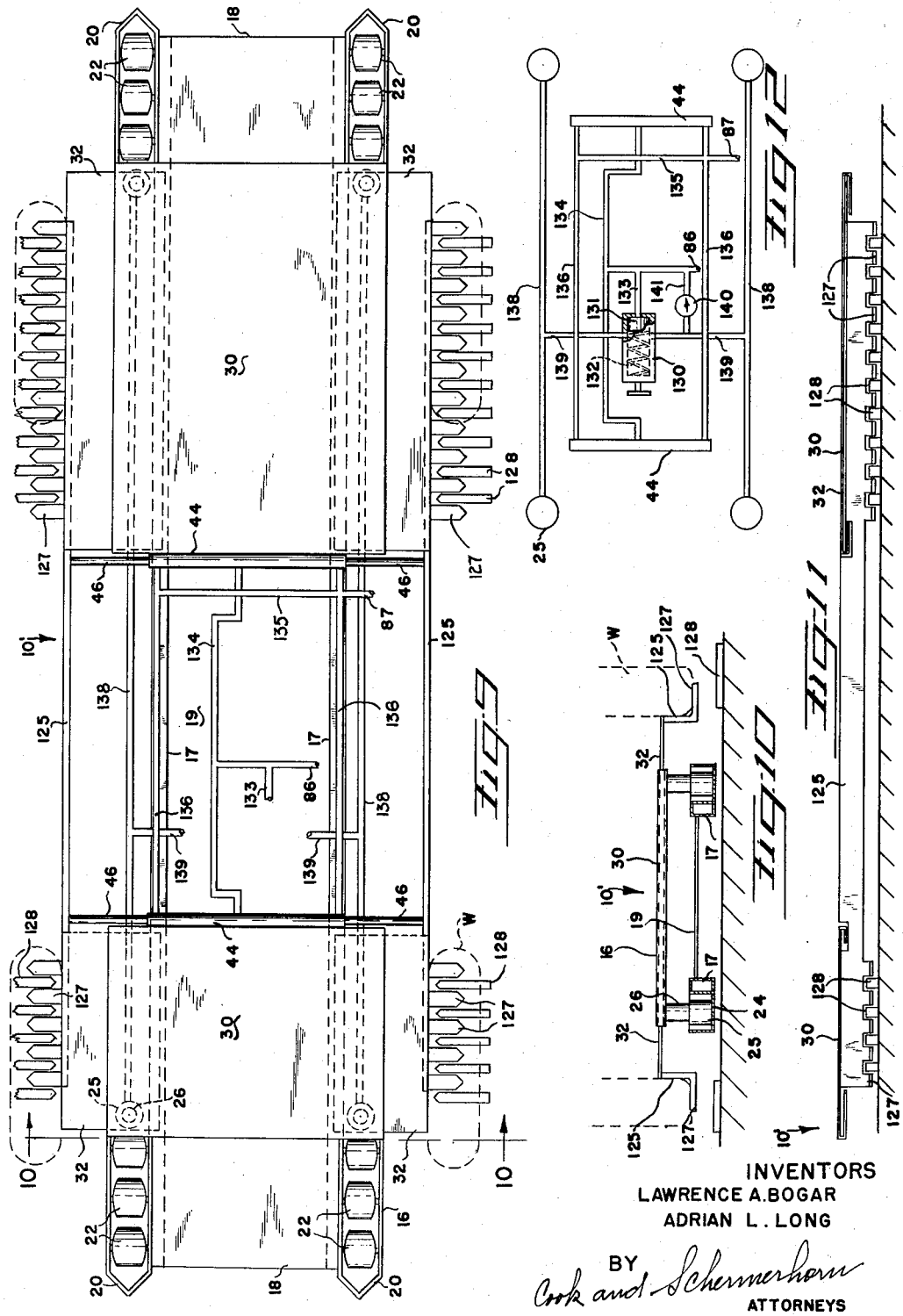

United States Patent Office 2,967,634
Patented Jan. 10, 1961

2,967,634

VEHICLE TRANSFER CARRIER

Lawrence A. Bogar, 3218 W. Daisy Ave., and Adrian L. Long, 963 E. 13th Ave., both of Spokane, Wash.

Filed Dec. 26, 1956, Ser. No. 630,559

9 Claims. (Cl. 214—331)

This invention relates to a novel transfer carrier or dolly, and, although the device may have numerous applications, it is illustrated and described herein in connection with the storage of vehicles in a tiered structure designed for such purpose.

In the type of parking facility with which the invention is primarily concerned, an elevator tower runs on a track past the tiers of parking spaces for lifting vehicles from the street level and placing them in positions to enter available parking spaces. The present invention relates to improvements in the dolly used for transferring the vehicles on and off the elevator platform so that they do not have to be driven under their own power. Such dollies have heretofore been equipped with jacks which frequently damage grease fittings and other devices on the axles and undercarriage. The nature of the jacks also limits the ranges of wheel base lengths and tread widths which may be handled by the elevator.

A principal object of the invention is, therefore, to provide an improved transfer carrier for the purpose mentioned which engages and lifts a vehicle in a novel and efficient manner.

Another object is to provide novel jack means for lifting a vehicle by its wheels without damage to its undercarriage.

Another object is to provide means for turning the steerable wheels of a vehicle to straightforward position prior to lifting the vehicle by its wheels.

More specifically, it is an object to provide a vehicle transfer carrier having steadying means arranged to engage the inside surfaces of the vehicle tires to prevent the wheels from rotating in a lifting operation.

Further objects are to provide in a preferred embodiment a carrier having longitudinally movable shoe means arranged to engage the tread surface of the tires above the bottom for lifting the vehicle by operation of the jack means, to provide an improved hydraulic pressure system for operating the steadying means, the shoe means and the jack means, and to provide an improved control system for operating said means in sequence for lifting the vehicle.

A further object is to provide a modified form of carrier having lateral projections adapted to move under vehicle wheels and establish lifting engagement with the bottom of the wheels and having cooperation with vehicle supporting floor structure which permits said lateral projections to move under the wheels.

A still further object is to provide a mechanism of the type described having a stabilizing device preventing tilting of a vehicle on the jacks.

Still another object is to provide a vehicle transfer carrier having a wide range of accommodation for lifting and moving vehicles of different sizes without manual adjustment of any of the parts.

The invention illustrated comprises novel and improved forms of transfer carriers or dollies utilized in placing vehicles in tiered storage structures. The invention involves mechanism for lifting one or both ends of a vehicle and moving the vehicle into and out of a horizontally and vertically traveling elevator in said structure. In a preferred embodiment a wheeled carriage frame, movable on and off the elevator, supports a lift frame thereon having laterally movable side rails with longitudinally slidable wheel pickup shoe assemblies supported thereby. The side rails are engageable with the vehicle wheels at the inner sides of the tires and the pickup shoe assemblies are engageable with the tread surface near the bottom of the tires. The lift frame is movable vertically by jack means on the carriage. The device is equipped with hydraulic means for moving the side rails in opposed directions laterally of the carriage and for moving the pickup shoes in opposed directions longitudinally of the carriage. The jacks are also hydraulically operated and the device includes control means for operating the hydraulic devices in a particular sequence in the lifting of a vehicle comprising first moving the side rails into frictional engagement with the tires, then moving the pickup shoe assemblies into engagement with the tread surface of the tires for providing lifting points, and then operating the jack means for raising the vehicle in supported relation on the carriage. The device also utilizes stabilizing means for the lift frame to prevent tilting of the vehicle when it is raised.

A modified dolly structure has laterally projecting fingers on the side frames which are adapted to move under the vehicle wheels for engaging the bottom of the wheels in a lifting operation, this embodiment being utilized with floor structure having means for supporting the vehicle in a position to permit said fingers to be inserted under the wheels.

The invention will be better understood and additional objects and advantages will become apparent from the following description in connection with the accompanying drawings which illustrate preferred forms of the invention. It is to be understood, however, that the invention may take still other forms, and that all such modifications and variations within the scope of the appended claims which will occur to persons skilled in the art are included in the invention.

In the drawings:

Figure 1 is a top plan view of the present transfer carrier with some parts broken away, the vehicle steadying means and the wheel pickup shoe assemblies being shown in engagement with the vehicle wheels in preparation for a lifting operation;

Figure 2 is a schematic view of a portion of the hydraulic system for operating the side rails, the wheel engaging means, and the jacks on the carrier;

Figure 3 is a fragmentary side elevational view of the carrier in Figure 1;

Figure 4 is a schematic perspective view in reduced size of the stabilizing means removed from the carrier;

Figure 5 is a sectional view taken on the line 5—5 of Figure 1;

Figure 6 is an enlarged fragmentary sectional view in plan, showing in particular a wheel pickup shoe assembly;

Figure 7 is a fragmentary elevational view showing the lift frame in raised position;

Figure 8 is an elevational view, greatly reduced, showing a vehicle parking storage structure with which the present carriers are used;

Figure 9 is a top plan view of a modified form of transfer carrier;

Figure 10 is a sectional view taken on the line 10—10 of Figure 9;

Figure 11 is a side elevational view showing a lift frame portion of the carrier in cooperation with vehicle supporting floor means which permits lateral projections on the carriage to move under the vehicle wheels; and Figure 12 is a schematic view of a portion of the hydraulic system for operating carrier parts.

Figure 1 embodiment

The present transfer carrier, or dolly, is designated generally by the numeral 10, and, as seen in Figure 8, is carried on the platform of an elevator 11. The elevator 11 travels vertically and horizontally in a corridor of a multi-story building structure 12 having vertically arranged stalls 13 for storing automotive vehicles. The transfer carrier moves in a longitudinal direction into and out of the stalls 13 by any suitable drive means, not shown.

The carrier, or dolly, 10 comprises a carriage 16 consisting of longitudinal hollow rectangular beams or frame members 17, Figures 1 and 5, having integral reinforcing top end plates 18 and an intermediate plate 19 which is also secured to the frame members 17 but is disposed below the upper edges thereof, as shown in Figure 5. Secured to the sides of the frame members 17 adjacent the ends are frame members 20 in which are mounted wheels or rollers 22 which support the carriage 16 for longiudinal movement. Also carried by the longitudinal frame members 17 are support structures 24 for hydraulic jacks 25 having vertically projecting piston rods 26.

Integrally connected to the upper end of the piston rods 26 at each end of the carriage are guide members or plates 30 having laterally disposed slots 31, Figure 5, in which are slidably mounted extension arms or plates 32 having a retracted position and an extended position in engagement with the vehicle wheels W, as will be explained. Secured to the arms 32 are longitudonal hollow beams or frame members 36 having bottom wall extensions 37, Figure 5, provided with edge rail portions 38. An upper rail 39 is also provided on each side of the carriage, these rails having a portion 40 projecting below the bottom surface of arms 32. Arms 32 have end extensions 41 adapted to enter in notches 42 in the base frame 16 for lying flush with the edge of the frame members 20 when the arms 32 are disposed in their retracted position. The members 30 are adapted to be raised vertically by the jacks 25 and are guided in such movement by guide arms 43, Figures 1 and 5, forming a part thereof and having guiding engagement with the outer vertical side walls of carriage frame members 17.

Lateral reciprocal movement of the arms 32 and integral longitudinal frame members 36 is accomplished by double acting fluid cylinders 44 secured to each of the guide members 30. These cylinders have pairs of laterally projecting piston rods 45 secured to the frame members 36 and are adapted to move these members outwardly wherein the arm extensions 41 engage the inner sides of the vehicle wheels W or adapted to move these members to their retracted position flush with the edges of the wheel frame members 20. As vehicle tires are wider than the wheel structure, the extensions 41 engage the tires, and no contact is made with said wheel structure. Also, the extensions 41 are supported in a plane sufficiently low so that they do not come in contact with wheel supporting or steering mechanism.

The present carrier has wheel pickup assemblies 49 comprising shoes 50 adapted in a lifting position to engage the peripheral surface of the vehicle tire at the lower portion of the wheel intermediate the bottom and horizontal center line thereof, the point of engagement with the tire being best shown in Figure 3. Shoes 50 have an inclined wheel engaging surface 51, Figures 3 and 7. Referring now to Figures 1 and 6, the shoes 50 have an integral cam arm 52 and are supported on vertical shafts 53. These three parts of each assembly form an integral structure and are adapted to rotate through ninety degrees between a retracted position wherein the shoe is parallel to the frame members 36, Figure 6, and a wheel engaging position at right angles to its retracted position, Figure 1.

Shaft 53 is journaled in bearings 55 and 56. Secured along the outer side of each of the frame members 36 in the area formed by extensions 37 is a pair of double acting cylinders 60 having piston rods 62 projecting therefrom to which are attached push plates or blocks 63 on which the bearings 55 and 56 are integrally supported. These push plates are movable longitudinally of the carrier by the piston rods 62 and slide on the extensions 37. The lower ends of the plates are guided in longitudinal movement by the bottom rails 38 and the upper ends are guided by a sliding engagement of the upper bearing 55 with the rail projection 40. Plates 63 are slotted at 65, Figure 6, transversely of the carrier for receiving the cam arms 52 in the retracted position of the wheel pick-up assemblies, and the frame members 36 are also transversely slotted at 66 for receiving said arms. A torsion spring 67, having one end secured to the plate 63 and its other end in abutting engagement with the shoe 50, is provided on each shaft 53 and biases the shoe and its arm and shaft counterclockwise so that in its retracted position the shoe 50 is held in parallel relation to the frame member 36.

One of the wheel pickup shoes 50 and associated structure is shown in its fully retracted position in Figure 6, i.e., the piston rod 62 has been moved to its extreme right-hand position by the cylinder 60. In this position the arm 52 is disposed in the slot 66. When a vehicle is to be engaged for lifting, the piston rod 62 moves to the left and its plate 63, which comprises an integral part of the bearings 55 and 56, moves the assembly 49 therewith. As the arm 52 moves to the left it abuts against the left-hand wall of slot 66 and is caused to rotate in a clockwise direction, and, upon sufficient movement, the end wall of the arm engages the outer face of the frame member 36, as seen in Figure 1, to slide therealong and maintain the shoe 50 in a position at right angles to said frame member. Such clockwise rotation of the arm 52 is accomplished against the action of spring 67 so that when this assembly is retracted to the position shown in Figure 6 the spring urges the shoe 50 counterclockwise to move the arm into the slot 66 and hold the assembly in retracted position.

The structure supported on the jacks 25, comprising the guide members 30 and the side frame structures 36, constitutes a lift frame adapted to be raised and lowered on the wheeled carriage 16. To prevent lateral tilting of the platform which may result if the jacks 25 do not operate upwardly or downwardly at the same rate, a stabilizing device 70, shown schematically in Figure 4 and in detail in Figures 1 and 7, is utilized. The device 70 comprises a pair of torsion bars 71 connected to the guide members 30 by bearings 72. Each torsion bar has a pair of integral angularly disposed arms 73 having rollers 74 on the lower ends thereof which operate between the under surface of longitudinal guide tracks 75 and a horizontal bottom flange 76 of the carriage frame member 17. With this arrangement the torsion bars 71 and their arms are free to rotate as a unit as the housing 30 is raised or lowered at an equal rate on each side, and upon vertical movement of the guide members 30 the rollers 74 move between the parallel track surfaces 75 and 76. If one of the jacks in a pair should attempt to move upwardly or downwardly at a faster rate than the other, the stabilizer by the torsion applied to the bar 71 equalizes this unbalanced travel and holds the lift frame on an even keel.

The stabilizing structure described so far is important in preventing a vehicle carried on the dolly from tilting sideways and engaging building structure or other vehicles. Although slight longitudinal tilting of the vehicle is not particularly objectionable, occasioned by the jacks at one end moving upwardly or downwardly faster than at the other end, such tilting may be prevented by pivotally interconnecting the two arms 73 on each side with longitudinal bars or rods 78. The elevating platform, together with the bars 78 and interconnecting arms 73, forms a parallelogram linkage, with the result that if one end attempts to rise slower than the other, it will get an assist from the opposite end and the lift frame will remain horizontal at all times.

*Figure 1 hydraulic system*

Fluid under pressure is supplied to the hydraulic devices comprising the jacks 25 and the cylinders 44 and 60 by a pump 80, Figure 2, operating through a four-way valve 81 and a sequence valve 82, Figure 1. The four-way valve 81 has a lever 84 having two positions whereby in a first position fluid under pressure is supplied to a conduit 86 and in a second position fluid under pressure is supplied to a conduit 87. In either position of the lever 84, one of the conduits 86 or 87 is a pressure line and the other is an exhaust line, the one conduit which is in exhaust communicating with a conduit 88 which leads to a reservoir tank 90.

Sequence valve 82 has an internal bore 92 in which is slidable a piston or regulator 93 urged toward the front of the valve by a compression spring 94 in the bore, the tension of which is controlled by an adjusting screw 95 threadedly mounted in one end of the valve housing.

Conduit 86 feeds into the front or piston end of the bore 92 and has a branch pipe 98 in turn having branch lines 99, 100 and 101. Branch line 99 leads through the side of the valve into the bore 92 adjacent the front or piston end, and the lines 100 and 101 lead to the inner end of the cylinders 60 on one side of the carrier, the pipe 98 having a check valve 102 between its connection with the conduit 86 and the branch line 99 which prevents flow of fluid from conduit 86 through pipe 98 but permits reverse flow. Conduit 86 has another branch line 104 in turn having branch lines 106 and 107. Branch 106 connects to a line 108 which leads to the center of the cylinders 44. Branch 107 has one end leading through the side of the valve into the bore 92 in the same diametrical plane as the line 99 and also leads to the inner end of the other two cylinders 60 by means of branch lines 109 and 110. A check valve 112 is connected in the line 104 between the juncture of this line with the lines 106 and 107.

Conduit 87 connects with a line 115 which leads to the outer ends of the right-hand cylinder 44 and also connects to a line 116 having its ends communicating with the outer ends of two cylinders 60 and being connected to a line 117 having branches 118 which communicate with the outer end of the other two cylinders 60. The end of line 117 opposite from its connection with line 116 leads to outer ends of the left-hand cylinder 44. Communicating with the bore 92 of valve 82 in a predetermined diametrically aligned position are a pair of lines 120 connecting with lines 121 leading to the jacks 25.

Although the cylinders 44 and 60 are illustrated herein as being double acting cylinders, it is within the purview of the invention to utilize single acting cylinders with spring means for returning the piston rods. It is to be understood that the fluid pressure lines are formed of flexible hose, where necessary, to follow movement of the various parts, and, furthermore, it is to be understood that, while hydraulic pressure is mentioned herein for operating the pistons in the various cylinders, air pressure may as well be used.

*Operation of Figure 1 embodiment*

When the carrier or dolly has been moved beneath a vehicle by suitable means, not shown, the operator shifts the lever 84 of the four-way valve 81 into a position 90 degrees from that shown in Figure 2 or, in other words, in a position wherein the valve 81 establishes communication directly between the pump 80 and the conduit 86 and the conduit 87 communicates with the conduit 88 leading to the reservoir tank 90. Fluid under pressure then flows through the conduit 86 and applies fluid pressure against the piston 93 in the valve 82 and also flows through branch line 104 and branch lines 106 and 108 which lead to the center of the cylinders 44. The spring resistance against the piston 93 is of sufficient force that the piston 93 will remain in its forward position at this time and fluid pressure in the lines 106 and 108 operates upon the cylinders 44 to drive the piston rods 45 and frame members 36 outwardly whereby the arm extensions 41 engage the inner sides of the wheels, the frame members 36 being supported in this movement by the arms 32 having telescoping engagement with the members 30. If one of the moving frame members engages a set of wheels before the other, the side which has reached the wheels stops and the other side continues to move whereby no lateral shifting of the vehicle or of the carrier results. Check valves 102 and 112 prevent the flow of fluid to other cylinders at this stage of operation.

During the outward movement of piston rods 45 fluid from the outer ends of cylinders 44 returns through conduits 117, 116, 115, 87 and 88 to tank 90.

If the front wheels of the vehicle were not left in straight-forward position the arm extensions 41 will then turn them straight-forward so that the shoes 50 will have secure bearing against all four tires when the shoes advance into contact with the tires.

Upon the lateral engagement of both side frames with the vehicle wheels, pressure rises in the conduit 86 to move the piston 93 a short distance rearwardly against the force of spring 94 to uncover the outlets from bore 92 to lines 99 and 107 whereupon fluid pressure is permitted to flow through these lines and their branch lines 100, 101 and 109, 110, respectively, to the inner ends of the cylinders 60. Fluid pressure, at the inner ends of the cylinders 60 operates to drive the pistons therein and move the piston rods 62 outwardly in opposed direction. The piston rods 62 thereby move the shoe assemblies toward the wheels and, as seen in Figure 6, as soon as the shoe assembly begins to move leftward toward the wheel the cam arm 52 rides out of the slot 66 and rotates the shoe 50 to a position at right angles to its retracted position. All four shoes move into engagement with the peripheral surface of the tire in the lower arc thereof, and the points of engagement of the shoes 50 with the tires establish lifting points for the vehicle.

During the outward movement of piston rods 62 fluid from the outer ends of cylinders 60 returns through conduits 116, 118, 117, 115, 87 and 86 to tank 90.

With the shoes 50 in engagement with the wheels, pressure again rises and the piston 93 is moved still farther back against the action of spring 94 to uncover the openings of lines 120 whereupon fluid pressure is admitted to the jacks 25 for raising the lift frame and lifting the vehicle. The pump continues to operate to maintain its rated output pressure in the system whereby there is developed sufficient thrust in piston rods 62 to hold the shoes 50 in clamped positions against the tires as the vehicle is lifted. The wheels are lifted clear of the floor by the shoes 50, whereby the vehicle may then be rolled on or off the elevator platform 11 and into and out of its parking stall on the dolly wheels 22. Sufficient outward force is exerted by the rails against the wheels to prevent the wheels from rotating wherein the vehicle will remain in a set position on the shoes 50.

To lower the vehicle on the carrier, lever 84 of valve 81 is shifted back to its position shown wherein the pump communicates directly with the conduit 87 and the conduit 86 communicates with the tank 90 by means of conduit 88. The weight of the vehicle and lift frame then immediately depresses the jack pistons, causing the fluid in the jack cylinders to be discharged through check valves 125 to tank 90. In this position of the valve fluid pressure is introduced to the outer ends of cylinders 60 to retract the shoes 50, the exhaust for the cylinders flowing through lines 100, 101, 109, 110, 98, 107, check valves 102 and 112, and conduits 104, 86 and 88 back to tank 90. Upon nearing the retracted position of the wheel pickup assemblies, the cam arms 52 move into the slots 66 as the shoes 50, under the action of springs 67, rotate to their retracted position parallel with the side frames.

Pressure in conduit 87 also reaches the outer ends of cylinders 44 through conduits 115, 116 and 117 to retract the side rails, the fluid from the centers of these cylinders being relieved through conduits 108, 106, 104, 86 and 88 back to tank 90.

*Figure 9 embodiment*

In Figures 9–12 there is shown a transfer carrier or dolly 10′ having means for engaging the vehicle at the bottom of the wheels in a lifting operation. This carrier comprises a carriage 16 having longitudinal frame members 17 supporting end plates 18 and an intermediate plate 19. The carriage has end frame members 20 in which are mounted wheels or rollers 22, and has support structures 24, Figure 10, for hydraulic jacks 25 having vertically projecting piston rods 26. Similar to the Figure 1 embodiment, the present embodiment has guide members or plates 30 connected to the piston rods 26 and has telescoping extension arms or plates 32. In the present embodiment, one of the guide members 30 has an extended dimension longitudinally of the carriage, and its arms 32 are also of extended dimension for a purpose to be described. The arms on each side of the carriage are connected by a longitudinal rail 125 and lateral reciprocal movement of these rails and the integral arms 32 is accomplished by a pair of double acting fluid cylinders 44 secured to the guide members 30, these cylinders having laterally movable piston rods 46 secured to the rails 125 so that upon operation of the cylinders the arms 32 are adapted to be moved inwardly or outwardly between a retracted position and a wheel engaging position.

Rails 125 have lateral projections or fingers 127 adjacent their ends which are adapted to engage the bottom of the vehicle wheels in a lifting operation. The present carrier embodiment is used in connection with floor bars 128 on which the vehicle is supported when the carriage is moved thereunder. The bars 128 are provided in each of the stalls 13 for the vehicle and at the bottom loading level and, as seen in Figure 11, these bars are spaced apart a distance slightly greater than the width of the fingers 127 so that, upon outward lateral movement of the arms 32, the fingers are readily movable between the bars 128 to a position beneath the vehicle wheels. The fingers 127, in the lowered position of the lift frame, are spaced off the floor but the upper surfaces thereof are in a plane below the top of the bars 128. Upon upward movement of the lift frame, comprising the members 30 and interconnecting rails 125, the fingers engage the bottom of the vehicle wheels to carry the vehicle upwardly therewith.

The stabilizing device of Figure 4 may be included in the embodiment of Figure 9 if desired.

*Figure 9 hydraulic system*

In this embodiment a sequence valve 130, having a piston or regulator 131 urged toward the front of the valve by a spring 132, is connected at its piston end with a branch line 133 from a conduit 86 leading from a four-way manual control valve of the type shown in Figure 1. A conduit 87 is also connected to the four-way valve, and this valve is adapted to permit fluid under pressure from a pump to flow into either of the conduits 86 or 87 and to cause the one which is not under pressure to be an exhaust in communication with a reservoir. The conduit 886 has a branch line 134 leading to the center of cylinders 44 between the pistons therein. Conduit 87 is connected to the outer ends of the cylinders 44 by suitable branch lines 135 and 136. Pairs of the jacks 125 are connected by hydraulic lines 138 each having a branch line 139 connected into the valve 130 a predetermined distance from the front wherein, when the piston 131 in the valve is retracted a certain distance, fluid pressure from the conduit 86 can flow through the valve and into the jack cylinders. A check valve 140 is provided in a branch line 141 connected between conduit 86 and one of the branches 139.

*Operation of Figure 9 embodiment*

When a vehicle is to be parked by means of the present dolly, it is first moved onto the parallel bars 128 at the bottom loading level. The dolly is then run beneath the vehicle by suitable power means, not shown, and the valve means operated so that fluid pressure exists in conduit 86 wherein fluid flows to the center of the cylinders 44 through line 134 and causes the piston rods thereof to move outwardly to spread the arms 32 and cause the rails 125 to engage the inner walls of the vehicle tires. The force exerted against the wheels is sufficient to prevent the wheels from rotating when the car is lifted, whereby it is not necessary to set the parking lock device or brake on the vehicle. During the outward movement of the piston rods 46 fluid from the outer ends of the cylinders 45 returns through the exhaust line 87.

Upon the lateral outward movement of the arms 32, the fingers 127 move into the channels or grooves between the bars 128 with the top thereof disposed below the top of the bars so as to be slidable beneath the vehicle wheels, the extended longitudinal dimension of the one arm 32 and its guide accommodating vehicles of different wheel base. The spring resistance against the piston 131 of the valve 130 is of sufficient force that said piston will remain in its forward position while the arms 32 are moving outwardly, but, when the arms are stopped by the wheels, the pressure rises in the conduit 86 and the piston 131 moves rearwardly and opens the branch lines 139 to the jacks, whereupon fluid pressure operates the jacks to raise the guide members 30 and the vehicle, the fingers 127 in this vertical movement rising upwardly through the bars 128. The vertical movement of the piston rods 26 is sufficient so that the fingers 127 clear the tops of the bars and permit the carriage to move longitudinally.

When the carriage has been moved into a desired stall the manual control valve is operated to change the flow of fluid wherein the conduit 87 becomes a pressure line and the conduit 86 becomes an exhaust line. The jacks 25 are lowered by the weight of the vehicle and the vehicle comes to rest on the bars 128, the fingers 127 moving down through said bars. Exhaust fluid from the jacks discharges through branch lines 139 and 141, check valve 140, and conduit 86. Pressure in conduit 87 flows to the outer ends of the cylinders 44 to move the piston rods 46 inwardly and retract the arms 32.

Although bars 128 are illustrated for supporting the vehicle in a position wherein the fingers 127 can move under the wheels, it is to be understood that other means may as well be used. For example, the floor may have grooves or channels therein for receiving the wheel pickup fingers and other structure of the carriage, which arrangement would eliminate the bars 128 but, similarly and importantly, would have transverse grooves below a vehicle supporting surface for receiving the lateral fingers.

In both embodiments of the invention, the use of laterally extendable side rails is of advantage in straightening the front wheels for straightforward travel on the front wheels in transfer carriers having jacks under only the rear end of the vehicle. In such cases the side rails may be brought to bear against the insides of the tires with a light pressure sufficient to steer the front wheels straight ahead without interfering with their rolling movement.

The present transfer carriers will automatically accommodate vehicles of varying wheel base length and tread width without adjustment by the operator, and damage to fittings on the under carriage is avoided by the wheel pickup feature. It will be apparent to persons skilled in the art that the pickup shoes of the Figure 1 embodiment may also be arranged to engage the tires on the front faces of the front wheels and the rear faces of the rear wheels.

Having now described our invention and in what manner the same may be used, what we claim as new and desired to protect by Letters Patent is:

1. A vehicle transfer carrier comprising a carriage adapted to be rolled under a vehicle, a lift frame on said carriage, laterally extendable longitudinal side members on said lift frame, fluid pressure operated means for extending said side members outwardly until their movements are arrested by engagement with the inner sides of the vehicle wheels, wheel pick-up shoes mounted for longitudinal movement on said side members for engagement with peripheral surfaces of the vehicle wheels, fluid pressure operated means operable only after said extending movement of said side members is arrested to move said shoes longitudinally into wheel engaging positions, and fluid pressure operated jacks operable only after said shoes are moved to wheel engaging positions to elevate said lift frame for lifting the vehicle.

2. A vehicle transfer carrier comprising a carriage adapted to be rolled under a vehicle, a source of fluid pressure, a lift frame, fluid pressure operated jacks for elevating said lift frame on said carriage, fluid pressure operated longitudinal side members on said lift frame extendable outwardly until their movements are arrested by the inner sides of the vehicle wheels, fluid pressure operated wheel pick-up shoes mounted on said side members for longitudinal movement into engagement with peripheral surfaces of the vehicle wheels, and a three position sequence valve connected with said source of fluid pressure to control the sequence of operation of said jacks, side members and shoes, said valve having a first position admitting fluid pressure only for extending said side members, a second position admitting fluid pressure additionally for effecting longitudinal wheel engaging movement of said shoes, and a third position admitting fluid pressure additionally to said jacks for lifting the vehicle by said shoes.

3. A vehicle transfer carrier comprising a carriage frame adapted to be rolled under a vehicle, a lift frame, jacks for elevating said lift frame on said carriage frame, laterally extendable longitudinal side members on said lift frame, means on said lift frame for extending said side members into engagement with the inner sides of the vehicle wheels, wheel pick-up shoe assemblies mounted for longitudinal movement on said side members, means for moving shoe portions of said assemblies into engagement with peripheral surfaces of the vehicle wheels, a transverse torsion rod mounted for rotation about its axis on one of said frames, a pair of radial arms each fixedly connected at one end with an end of said rod, rollers on the free ends of said arms, and vertically spaced horizontal longitudinal guide tracks for said rollers on opposite sides of the other frame constraining said free ends of said arms to horizontal longitudinal travel when said lift frame moves up and down to prevent tilting of said lift frame.

4. A vehicle transfer carrier comprising a carriage adapted to be rolled under a vehicle, a lift frame, fluid pressure operated jacks for elevating said lift frame on said carriage, laterally extendable longitudinal side members on said lift frame, transverse cylinders on said lift frame having pistons connected with said side members for extending said members into engagement with the inner sides of the vehicle wheels, slide blocks mounted for longitudinal sliding movement on said side members, cylinders on said side members having piston rods connected with said blocks, wheel pick-up shoes pivotally mounted on said blocks, and means for rotating said shoes outwardly on said pivots as said blocks are advanced longitudinally on said side members.

5. A vehicle transfer carrier comprising a carriage adapted to be rolled under a vehicle, a lift frame, fluid pressure operated jacks for elevating said lift frame on said carriage, laterally extendable longitudinal side members on said lift frame, transverse cylinders on said lift frame having pistons connected with said side members for extending said members into engagement with the inner sides of the vehicle wheels, slide blocks mounted for longitudinal sliding movement on said side members, longitudinal cylinders on said side members having piston rods connected with said slide blocks, wheel pick-up shoes pivotally mounted on said slide blocks, each shoe having a bell crank actuating arm and a retracting spring, and longitudinal slots of predetermined length in said side members receiving said actuating arms in said sliding movement, said actuating arms upon reaching the ends of said slots being swung on said pivotal mountings to project said wheel pick-up shoes outwardly from said side members.

6. A vehicle transfer carrier comprising a carriage adapted to be rolled lengthwise under a vehicle, a lift frame, jacks for elevating said lift frame on said carriage, laterally extendable longitudinal side members on said lift frame, each side member being adapted to engage the inner sides of both front and rear wheels on one side of the vehicle, a wheel pick-up shoe mounted on each side member for movement laterally outward and longitudinally forward relative to the side member to engage a rearward peripheral under portion of a front wheel of the vehicle, a wheel pick-up shoe mounted on each side member for movement laterally outward and longitudinally rearward relative to the side member to engage a forward peripheral under portion of a rear wheel of the vehicle, and means for extending said side members into engagement with the vehicle wheels, extending and moving said pick-up shoes into engagement with said wheels and raising said jacks, in sequence, to lift the vehicle with each wheel supported by one pick-up shoe, said means being operable in reverse sequence to lower said jacks, retract said pick-up shoes and retract said side members, said pick-up shoes retracting laterally and longitudinally on said side members toward the centers of said side members.

7. A vehicle transfer carrier comprising a carriage adapted to be rolled lengthwise under a vehicle, a lift frame, jacks for elevating said lift frame on said carriage, laterally extendable longitudinal side members on said lift frame, each side member being adapted to engage the inner sides of both front and rear wheels on one side of the vehicle, a pair of slide blocks mounted for longitudinal sliding movement on each side member, a wheel pick-up shoe mounted on each slide block for laterally outward movement from said side member, means for moving said two slide blocks on each side member simultaneously in opposite directions along said side member toward the front and rear wheels of the vehicle, and means for projecting said pick-up shoes outwardly from said side members to engage peripheral under portions of the wheels of the vehicle in a position to support the vehicle with one wheel on each pick-up shoe when said jacks are raised, said means being operative in reverse movements when the jacks are lowered to move said slide blocks in the opposite directions away from said wheels and retract said pick-up shoes inwardly toward said side members to clear said wheels for movement of the carriage under the vehicle.

8. A vehicle transfer carrier comprising a carriage adapted to be rolled lengthwise under a vehicle, a lift frame, jacks for elevating said lift frame on said carriage, laterally extendable longitudinal side members on said lift frame, each side member being adapted to engage the inner sides of both front and rear wheels on one side of the vehicle, a pair of slide blocks mounted for longitudinal sliding movement on each side member, means for moving said slide blocks on each member in opposite directions away from each other and towards opposite ends of the carriage, a wheel pick-up shoe pivotally mounted on each slide block, and means for rotating said pick-up shoes outwardly on said pivots so that said shoes engage rearward peripheral under portions of the front wheels of the vehicle and forward peripheral under portions of the rear wheels of the vehicle to lift the vehicle with each wheel supported by one pick-up shoe when said jacks are raised, said slide blocks being retractable toward the centers of said side members to disengage said pick-up shoes from the wheels when the jacks are lowered and said pick-up shoes being retractable inwardly toward said side members to clear said wheels for movement of the carriage under the vehicle.

9. A vehicle transfer carrier comprising a carriage adapted to be rolled lengthwise under a vehicle, a lift frame, fluid pressure operated jacks for elevating said lift frame on said carriage, laterally extendable longitudinal side members on said lift frame, each side member being adapted to engage the inner sides of the front and rear wheels on one side of the vehicle, transverse cylinders on said lift frame having pistons connected with said side members for extending said members into said engagement, a pair of slide blocks mounted for longitudinal sliding movement on each side member, longitudinal cylinders on said side members having piston rods connected with said slide blocks and arranged to move said slide blocks in opposite directions away from each other toward opposite ends of the side member, a wheel pick-up shoe pivotally mounted on each slide block, each shoe having a bell crank actuating arm and a retracting spring, and longitudinal slots of predetermined length in said side members receiving said actuating arms in said sliding movement, said actuating arms upon reaching the ends of said slots being swung on said pivotal mountings to project said wheel pick-up shoes outwardly from said side members for engagement with peripheral under portions of the wheels of the vehicle to lift the vehicle with each wheel supported by one pick-up shoe when said jacks are raised, said slide blocks being retractable toward the centers of said side members to disengage said pick-up shoes from the wheels when the jacks are lowered and said pick-up shoes being retracted inwardly toward said side members to clear said wheels for movement of the carriage under the vehicle.

References Cited in the file of this patent

UNITED STATES PATENTS

| | | |
|---|---|---|
| 848,332 | Westervelt | Mar. 26, 1907 |
| 1,363,442 | Swern | Dec. 28, 1920 |
| 1,817,220 | Young | Aug. 4, 1931 |
| 1,962,127 | Balkema et al. | June 12, 1934 |
| 2,016,662 | Aitken | Oct. 8, 1935 |
| 2,629,507 | Olson | Feb. 24, 1953 |
| 2,634,091 | Littell | Apr. 7, 1953 |
| 2,647,647 | Alimanestiano | Aug. 4, 1953 |
| 2,732,083 | Smith | Jan. 24, 1956 |
| 2,734,519 | Widdowson | Feb. 14, 1956 |
| 2,764,869 | Scherr | Oct. 2, 1956 |
| 2,818,186 | Sinclair | Dec. 31, 1957 |
| 2,840,248 | Grove et al. | June 24, 1958 |
| 2,851,961 | Billings | Sept. 16, 1958 |

FOREIGN PATENTS

| | | |
|---|---|---|
| 59,475 | Norway | July 24, 1937 |
| 281,626 | Switzerland | July 1, 1952 |
| 305,594 | Switzerland | May 2, 1955 |
| 728,493 | Germany | Nov. 27, 1942 |
| 1,110,910 | France | Oct. 19, 1955 |